(12) United States Patent
Backer et al.

(10) Patent No.: US 12,449,806 B2
(45) Date of Patent: Oct. 21, 2025

(54) SYSTEM FOR SHARED REMOTE DRONE USAGE

(71) Applicant: DRISIT, INC., Pasadena, CA (US)

(72) Inventors: Alejandro Backer, Altadena, CA (US); Mauro Edgardo Lacy Bopp, El Puerto de Santa Maria (ES)

(73) Assignee: DRISIT, INC., Pasadena, CA (US)

( * ) Notice: Subject to any disclaimer, the term of this patent is extended or adjusted under 35 U.S.C. 154(b) by 147 days.

(21) Appl. No.: 18/350,665

(22) Filed: Jul. 11, 2023

(65) Prior Publication Data

US 2024/0019863 A1    Jan. 18, 2024

Related U.S. Application Data

(60) Provisional application No. 63/487,153, filed on Feb. 27, 2023, provisional application No. 63/389,800, filed on Jul. 15, 2022.

(51) Int. Cl.
| | |
|---|---|
| *G05D 1/00* | (2006.01) |
| *B64U 10/13* | (2023.01) |
| *G06F 3/04817* | (2022.01) |
| *G06T 11/00* | (2006.01) |
| *B64U 101/05* | (2023.01) |
| *B64U 101/30* | (2023.01) |

(52) U.S. Cl.
CPC .......... *G05D 1/0022* (2013.01); *B64U 10/13* (2023.01); *G05D 1/0038* (2013.01); *G05D 1/0044* (2013.01); *G06F 3/04817* (2013.01); *G06T 11/00* (2013.01); *B64U 2101/05* (2023.01); *B64U 2101/30* (2023.01); *B64U 2201/20* (2023.01)

(58) Field of Classification Search
CPC .. G05D 1/0022; G05D 1/0038; G05D 1/0044; G05D 2105/345; G05D 2109/20; G05D 1/2247; G05D 1/2265; G05D 1/686; G05D 1/6987; B64U 10/13; B64U 2101/05; B64U 2101/30; B64U 2201/20; G06F 3/04817; G06T 11/00; B64C 39/024
USPC .......................................................... 701/2
See application file for complete search history.

(56) References Cited

U.S. PATENT DOCUMENTS 9,552,736 B2    1/2017  Taveira
10,185,316 B2*  1/2019  Kablaoui ................ H04L 67/10
(Continued)

FOREIGN PATENT DOCUMENTS

EP    2450862    *  9/2014
EP    2450862 B1    9/2014
(Continued)

OTHER PUBLICATIONS

Brown, Eileen, "Rook launches the first home drone that you can fly from anywhere in the world", zdnet.com, Apr. 18, 2016. 5 pages.
(Continued)

*Primary Examiner* — Muhammad Shafi
(74) *Attorney, Agent, or Firm* — Steinfl + Bruno LLP

(57) ABSTRACT

Systems and methods for shared drone usage are disclosed. A drone owned by one party is made available for control by a second party through a combination of drone-end software, a streaming service, and a system backend. The second party is provided a set of controls that is translated into the manufacturer-designated controls for the drone.

18 Claims, 11 Drawing Sheets

(56) References Cited

U.S. PATENT DOCUMENTS

| | | | |
|---|---|---|---|
| 10,497,270 B2 * | 12/2019 | Taveira | G06Q 20/102 |
| 10,618,653 B2 * | 4/2020 | Han | H02J 7/0042 |
| 10,836,508 B2 * | 11/2020 | Overall | H04N 23/66 |
| 2018/0036740 A1 | 2/2018 | Collins et al. | |

FOREIGN PATENT DOCUMENTS

| | | | |
|---|---|---|---|
| KR | 101712280 B1 | | 3/2017 |
| WO | WO-2017220165 | * | 12/2017 |
| WO | 2020/237531 A1 | | 12/2020 |

OTHER PUBLICATIONS

Hall, Heather, "Drones can be controlled from anywhere thanks to ORNL global communication system, licensed by Horizon31 startup" R&D World Magazine, Aug. 13, 2020. 7 pages.

\* cited by examiner

SYSTEM FOR SHARED REMOTE DRONE USAGE

CROSS-REFERENCE TO RELATED APPLICATIONS

The present application is a U.S. non-provisional patent application that claims priority to U.S. Provisional Application No. 63/487,153 filed on Feb. 27, 2023, and U.S. Provisional Application No. 63/389,800 filed on Jul. 15, 2022, the contents of all of which are incorporated herein by reference in their entirety.

BACKGROUND OF THE INVENTION

Today, most drones sit idle most of the time, because they are usable by a single user. Likewise, most users do not have access to most drones in the world, because drones can only be controlled via a remote control within radio frequency range of the drone and their footage can only be seen within the same range by a single person. This is a huge limitation on the usefulness of drones, because a drone's applications are primarily determined by its location, so limiting a person's drone applications to those in his/her own location severely limit the applicability of drones to improve his/her life. In business applications, requiring drone pilots and users to travel along with the drones they use constitutes a huge inefficiency.

Similarly, today, people do not have a way to see most places on Earth on demand. People see what's in front of their eyes, or what is in front of a camera that someone places for them. Just like Alexander Graham Bell's telephone enabled speech to be transmitted at a distance, the present invention allows vision of remote places on demand.

SUMMARY

In a first aspect of the system, a system for remote drone control is described, comprising: an owner software application configured to be loaded on a first device, the owner software application enabling communication between the first device and a drone controller for a drone and providing drone control data to the drone controller; a pilot software configured to be loaded on a second device or loaded on a web server that is accessed from the second device, the pilot software enabling communication between the second device and the drone controller and providing the drone control data to first device; a streaming service communicating with the first device and the second device, the streaming service receiving a first video data from the first device and providing video data to the second device, based on the first video data and the first video data being provided from the drone; wherein the system is configured to translate a first set of drone control inputs from the pilot software to a second set of drone control inputs for the drone controller.

In a second aspect of the system, a system for remote drone control, comprising: an owner software application configured to be loaded on a docking station, the owner software application enabling communication between the docking station and a system backend; a pilot software configured to be loaded on a second device or loaded on a web server that is accessed from the second device, the pilot software enabling communication between the second device and the system backend and providing the drone control data to the docking station; the system backend comprising an application programming interface providing a communication interface to the docking station and the second device; and a streaming service communicating with the docking station and the second device, the streaming service receiving a first video data from the docking station and providing a second video data to the second device, the second video data being based on the first video data and the first video data being provided from the drone; wherein the system is configured to translate a first set of drone control inputs from the pilot software to a second set of drone control inputs for the docking station.

In a third aspect of the system, a method for accessing drone remotely is described comprising: presenting a user with a graphical user interface (GUI), the GUI comprising a geographical map and icons on the geographical map, wherein the icons represent drones at their respective locations on the geographical map; the GUI further comprising detecting the selection of a selected icon of the icons by the user; if a backend system registers that a drone corresponding to the selected icon is available, presenting the user with a screen providing options to control the drone or to view through the drone camera or to watch a pre-recorded video from the drone camera; and if the backend system registers that the drone corresponding to the selected icon is not available, presenting the user with a screen providing the option to watch a pre-recorded video from the drone camera.

In some embodiments, the pre-recorded videos are indexed by drone ID/name. In some embodiments, the pre-recorded videos are indexed by location (regardless of drone source).

DETAILED DESCRIPTION

As used herein, "drone" refers to a remotely controlled unmanned flying machine. Drones have a number of types, including single rotor, multi-rotor, fixed wing, fixed wing hybrid VTOL (vertical takeoff and landing), quadcopter, propeller, jet, etc. Drones can vary in size from ones being able to be held in one hand to ones over a meter across that can carry over 10 lbs of cargo.

While the description specifically refers to controlling drones throughout, it would known to one skilled in the art to modify the system to control/view other forms of remote-controlled machines (e.g., underwater unmanned vehicles, rovers, robots, etc.).

As used herein, "docking station" or "nest" refers to a platform where the drone is stored and/or recharges its battery when not in use. The docking station can include a controller (processor and transmitter/receiver) to send control commands to the drone and receive drone information (battery level, location, etc.) and video data from the drone.

Figure 1:
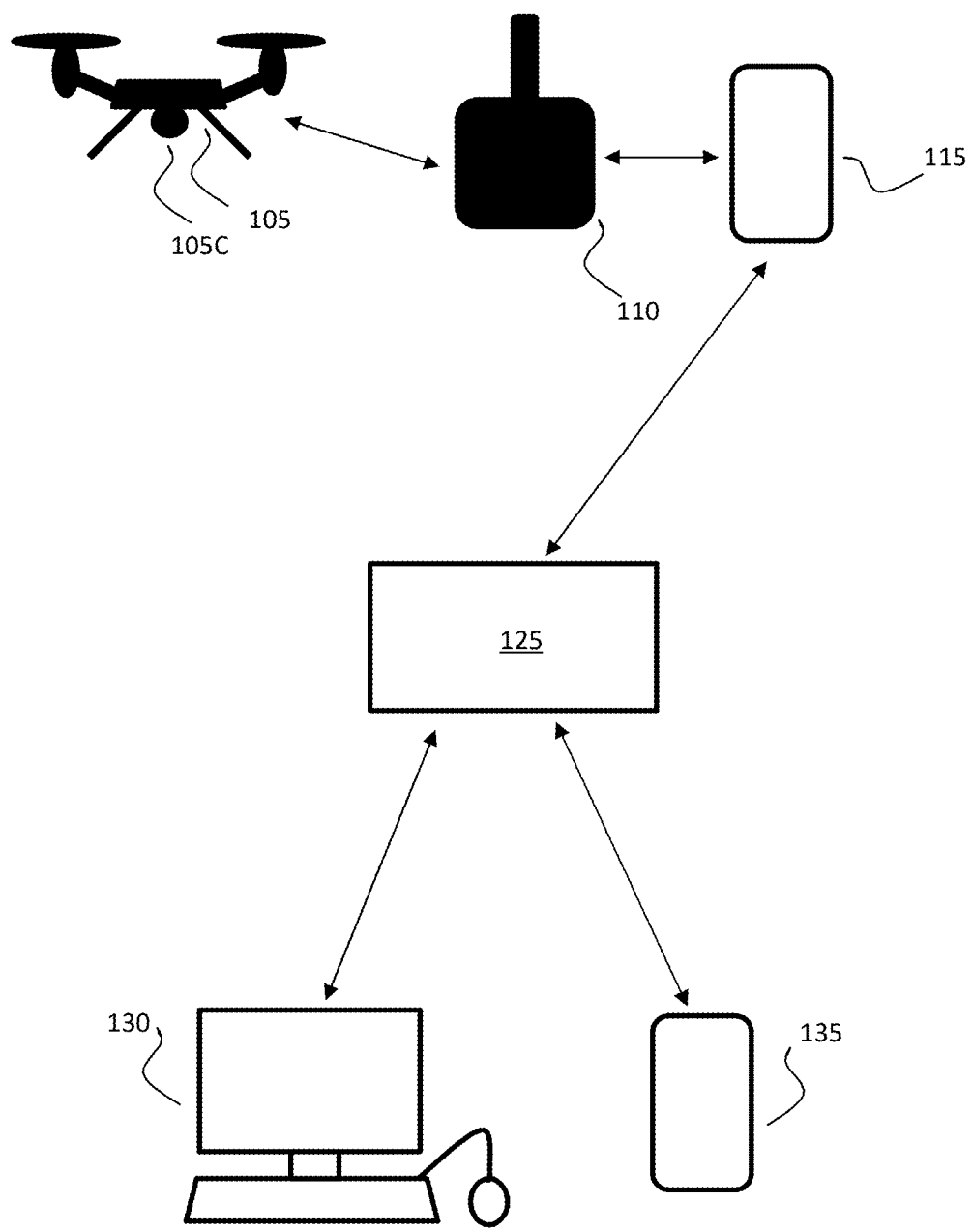
FIG. 1 shows an example system allowing remote users view live video footage from a drone over the internet.

FIG. 1 shows an example of a drone system where remote users (viewers) can view live drone footage for a drone, possibly someone else's. The drone (105) is controlled by a radio controller (110) by the drone's user. The user also has a mobile device (115) with an app that connects to the radio controller. The connection can be USB (universal serial bus), Bluetooth, WiFi, Firewire, or some equivalent communicative connection. The mobile device (115) provides streaming video from a camera (105C) on the drone (105) to a video delivery service (125) (e.g., Twitch, YouTube, proprietary server, etc.). The connection from the mobile device (115) to the video delivery service (125) can be provided over the internet through a secure IP transfer protocol. Viewers can access the video by connecting to the video delivery service (125) by a website connection (130) or a computer (or mobile device) app (135).

Figure 2:
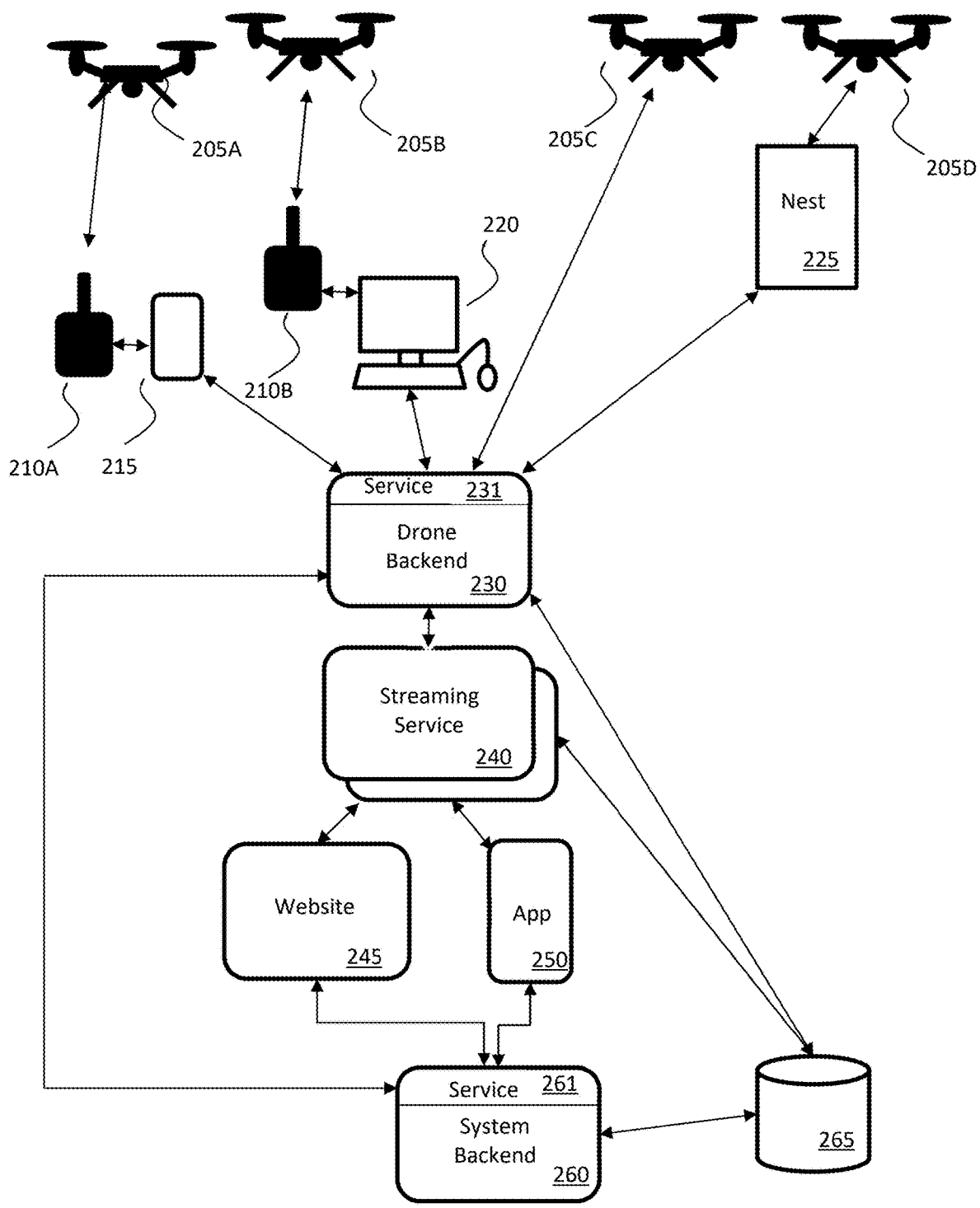
FIG. 2 shows an example system for allowing remote users to control and/or view footage from a drone over the internet.

FIG. 2 shows an example of a drone system where remote users (viewers/fliers) can access other people's drones to either view what the cameras on those drones are seeing while someone or something else flies the drone, or to remotely fly the drones themselves while viewing.

Drones (205A, 205B, 205C, 205D) owned by a first set of system users are made available to be used by a second set of users (some of which might be members of the first set—a drone owner remotely using another person's drone, or even their own drone, through the system).

A first type of drone setup involves the owner pairing/connecting their controller (210A) to an app on a device (215), to allow users to view the drone's video footage through a streaming service (240) and/or control the drone (205A) by connection to a drone backend service (231) set up on the drone backend (230). The drone backend (230) connects to the streaming service (240) for video and to the system backend (260) through a service (261) for system management and control. The system backend (260) can be connected to a database (265) that contains account and/or geographical data (e.g., geofencing, pre-set routes, etc.). The users can control the drone (205A) through a website (245) or app (250) connected to the streaming service (240) to see the drone footage and to the system backend (260) through the system backend service (261) to send control instructions to the drone (205A).

A second type of drone setup has the drone's controller (210B) connected to a video capture app on a device (220) that allows users to see drone footage from a streaming service (240). This is similar to the setup of FIG. 1.

A third type of drone setup involves a modified drone (205C) that uses an on-board computer with wireless connection to the internet (e.g., 5G) to connect to the streaming service (240) and the drone backend (230) through the drone backend service (231).

A fourth type of drone setup involves a drone (205D) that connects through a "nest" (basestation) (225) to the drone backend (230) through the drone backend service (231) to connect to the system backend (260) through the system backend service (261) and to the streaming service (240). The nest (225) can also include a nest control system to control the drone (205C). The users (245, 250) can control the drone and/or nest by the system backend (260).

Note that in all cases, the owner and user can be either different people, or the same person (i.e. someone controlling their own drone through the system).

Drone Backend

The drone backend module is in charge of providing access to a given drone through a service endpoint/API (drone backend service).

Smart Phone. A smartphone App can be used as drone "backend client"/drone connectivity solution. This App implements a connection to the drone either through WiFi (short range) or the drone Remote Control (RC). The app can use the drone vendor SDK to connect and interface with the drone. The App will need to register to the backend service, to allow remote access to the drone.

Onboard Computer. An onboard computer (OC) (e.g., Raspberry Pi or similar) running a drone flight operating system with a custom drone backend client (owner software application) is an alternative for remote drone access. Another alternative here is a programmable OC. If the OC can connect to the internet over LTE/mobile networks (e.g., 3G/4G/5G), that would allow for drone communications/access that is independent of the drone RC. Note that this would increase power demands on the drone.

Smart Controller. As an alternative to attaching a smartphone to a RC, some drone vendors offer a smart controller, that can, in principle, be programmed like a smartphone. This smart controller also offers HDMI video output.

Nest/Docking Station. Some drones have "nests", to enhance the drone with extra capabilities like ground computer, remote access/network connections, battery charging, identifiable precision landing spot, drone shelter, and more (e.g., base for connecting extra sensors, multiple drones support, etc.). Since this would be the equivalent of the OC on the ground instead of in the drone, no modifications to the drone are required. Also, by leveraging and integrating with the drone RC, no extra comm equipment is needed on the drone. Finally, it bears mentioning that a setup like this would allow for fully autonomous operation. That is, one that includes drone take-off, landing, battery charging, and drone storage.

Drone Backend API

The drone backend API (application programming interface) can be made compatible with current drone APIs. A similar API would allow for easy replacement/switching of one backend implementation by another. The drone backend API can be compatible across multiple devices, for example having the same API for smartphone programming and nest programming. There can be extensions designed for each device/platform, as not all devices would offer or expose exactly the same functionality/services.

System Backend

The system backend can be divided into two parts. One part is the one serving drones which transforms/leverages the Drone Backend into a Cloud/SaaS Backend. The other part is composed by the services/endpoints that are to be offered to Frontend clients.

Drone-serving backend. This is a service that acts like a "well known endpoint" (e.g., a URL) for drones to be registered in the system. Drones connect to it and announce their unique id, along with useful information for contacting the drone (e.g., IP address, service port, advertised services, etc.). This service can also provide functionality for accessing and controlling drones that are behind firewalls or networks that disallow incoming connections. This service offers a way for drones to obtain an endpoint for streaming videos, send telemetry and status data, etc.

The drone backend API (see below) implementation can be separated into a library, which basically wraps and unifies the drone vendor SDKs on one side, and the different backend service implementations (e.g., REST, WebSockets, RPC, etc.), on the other.

Drone Backend API. The Drone Backend API consists of registration services, along with services for providing configuration data to drones, agreeing on video streaming and telemetry endpoints, and sending commands to control drones.

Examples of Drone Backend API:
- rpc Register(Drone) returns (Response). Registers a drone to the backend. Includes a shared key for authentication.
- rpc Unregister(Drone) returns (Response). Deregisters drone from the backend.
- rpc GetEndpoint(EndpointType) returns (EndpointResponse). Negotiates endpoint (for example, for video streaming) information between drone and backed.
- rpc SetEndpointStatus(EndpointStatus) returns (Response). Updates the status (started/stopped) of the endpoint.
- rpc SendStatus(stream Status) returns (StatusSummary). Sends drone status information.
- rpc SendTelemetry(stream Telemetry) returns (TelemetrySummary). Sends drone telemetry.
- rpc ReceiveCommands(Drone) returns (stream Command). Establishes a channel for sending control commands to the drone.
- rpc SendCommands(stream ClientCommand) returns (CommandSummary). Sends remote control commands to a registered and remote-command enabled drone.
- rpc SetCapabilities(Capabilities) returns (Response). Informs the backed about specific drone capabilities.
- rpc AuthorizeDrone(FlightPlan) returns (Response). An API endpoint that allows drones to request authorization for a given flight plan/mission.

Client-facing backend. This is a service, possibly in the same backplane as the Drone-serving backend, that acts like a "well known endpoint" (e.g., a URL) for clients to obtain information about available drones and connect to them. Clients/users query this service, and obtain information about available drones, along with useful information for contacting the drone.

Client-facing backend API. The API consists of mostly query services, along with services for providing configuration data to drones, agreeing on video streaming and telemetry endpoints. It complements the Drone-serving API, but from the perspective from the client/user. This is also the place where all the services related to and necessary for the frontend functionality will be, such as: checking available drones; searching for a drone according to location, model, prices, etc.; scheduling/requesting drone flights; accessing and defining drone metadata, prices and fares, etc.; and others.

This service will also offer a way for clients to obtain the endpoint a given drone is streaming videos, sending telemetry and status data, etc. In short, everything that a drone register to as browsable/watchable, this part of the backend exposes to clients.

Frontend

The frontend allows for a variety of user functions. Examples include:
- The ability to view the camera of a drone with an automated flight path.
- The ability to control the camera angle of a drone (with or without an automated flight path).
- The ability to control a drone's flight path Beyond Visual Line of Sight (BVLOS). For example, the ability to set waypoints on a map for the drone's flight path.
- Imposing restrictions on the flight path. For example: can't fly below/above height h; can't get closer than m distance to any known object/point; can't fly past some predefined boundaries; when the drone remaining power drops below a value p, the drone automatically returns to its docking station; etc.
- The ability to see available locations to visit, by using an auto-piloted drone (including real time).
- The ability to know about pre-programmed automated flight paths, view the ones currently in flight, and be able to quickly and easily join one in flight.
- User account creation/editing.
- Searching for available drones and drone video streams according to location, keywords, tags, etc.
- Watching live as well as archived video footage from drones indexed by geographical location (e.g. a map) and date/time or by drone owner, for example.
- Bid/reserve/schedule a given drone for a remote-controlled flight.
- Client-side controlled digital zoom for drone video, allowing different users to have different levels of zoom and different center of image for a given drone video (live or recorded).

Drone Application (Drone App)

The Drone App, either running on a Mobile phone with a human pilot assistance, or on a docking station/nest, must allow for routing of all the functionality related to the Client App requirements. In particular:
- Sending video streams to a streaming service for user consumption.
- Sending drone telemetry and status data, to be stored in the backend database.
- Allowing for and redirecting commands to control and access the drone remotely.
- Supporting pre-planned/automated missions through Waypoints/Virtual Sticks.
- Supporting safety measures for emergency landing and return-to-home (RTH) functionality (emergency autopilot).

In the case of a docking station, these functionalities can also extend to:
- Automatic drone take-off.
- Automatic precision landing.
- Battery charging/replacement.
- Drone housing/weather/theft protection.
- Remote access/connectivity.

FIGS. 3-9 show example screens of the website/app client interface.

Figure 3:
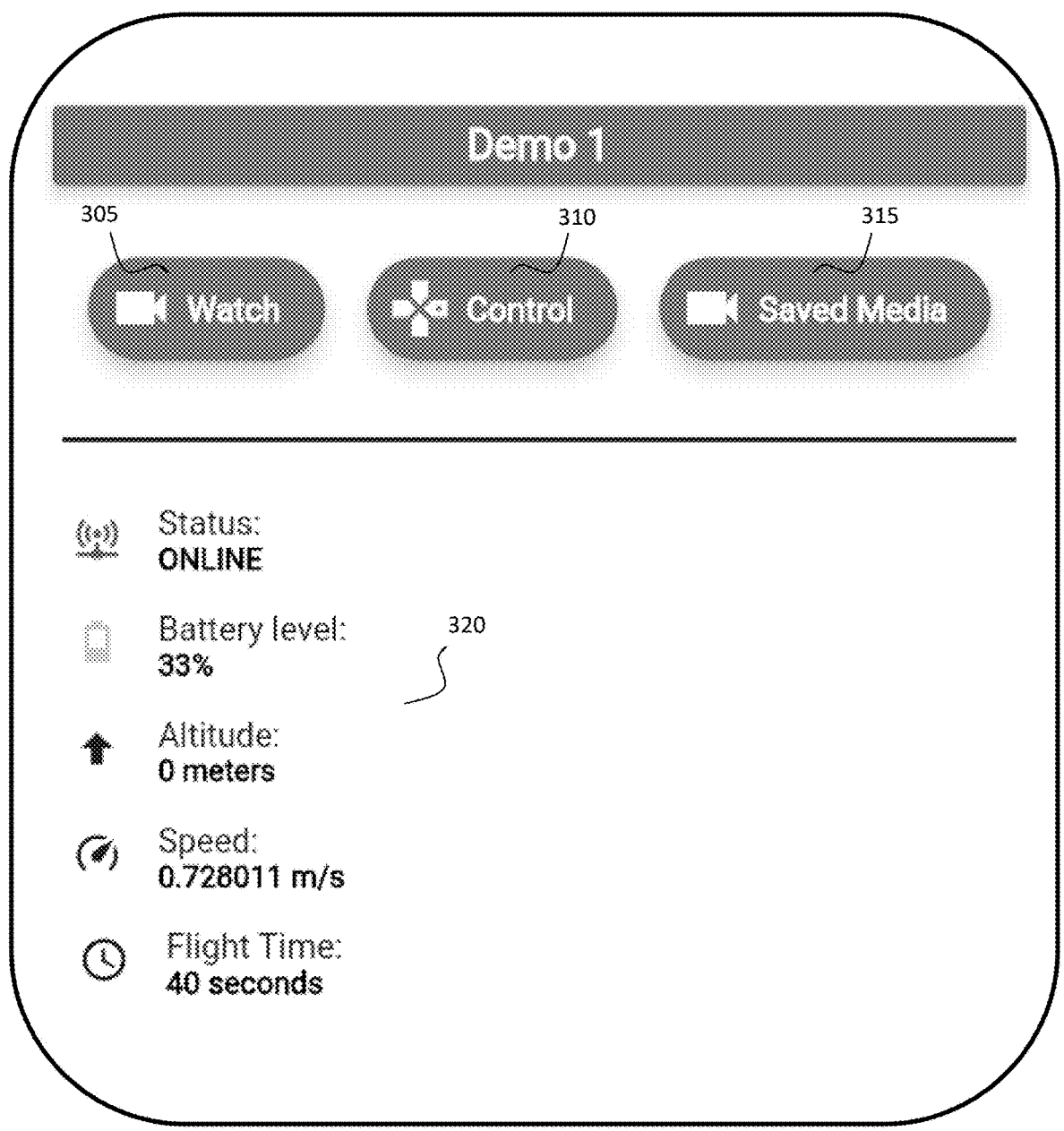
FIGS. 3-9 shows example GUI screens for a remote user to use the system.

FIG. 3 shows an example drone control screen, giving the user the options to watch (305) or control (310) a drone flight for a selected drone. There can also be a selection to watch a pre-recorded flight (315) of the drone. The screen can also provide data (320) of the drone, such as online status, battery level, current altitude, current speed, and current flight time.

Figure 4:
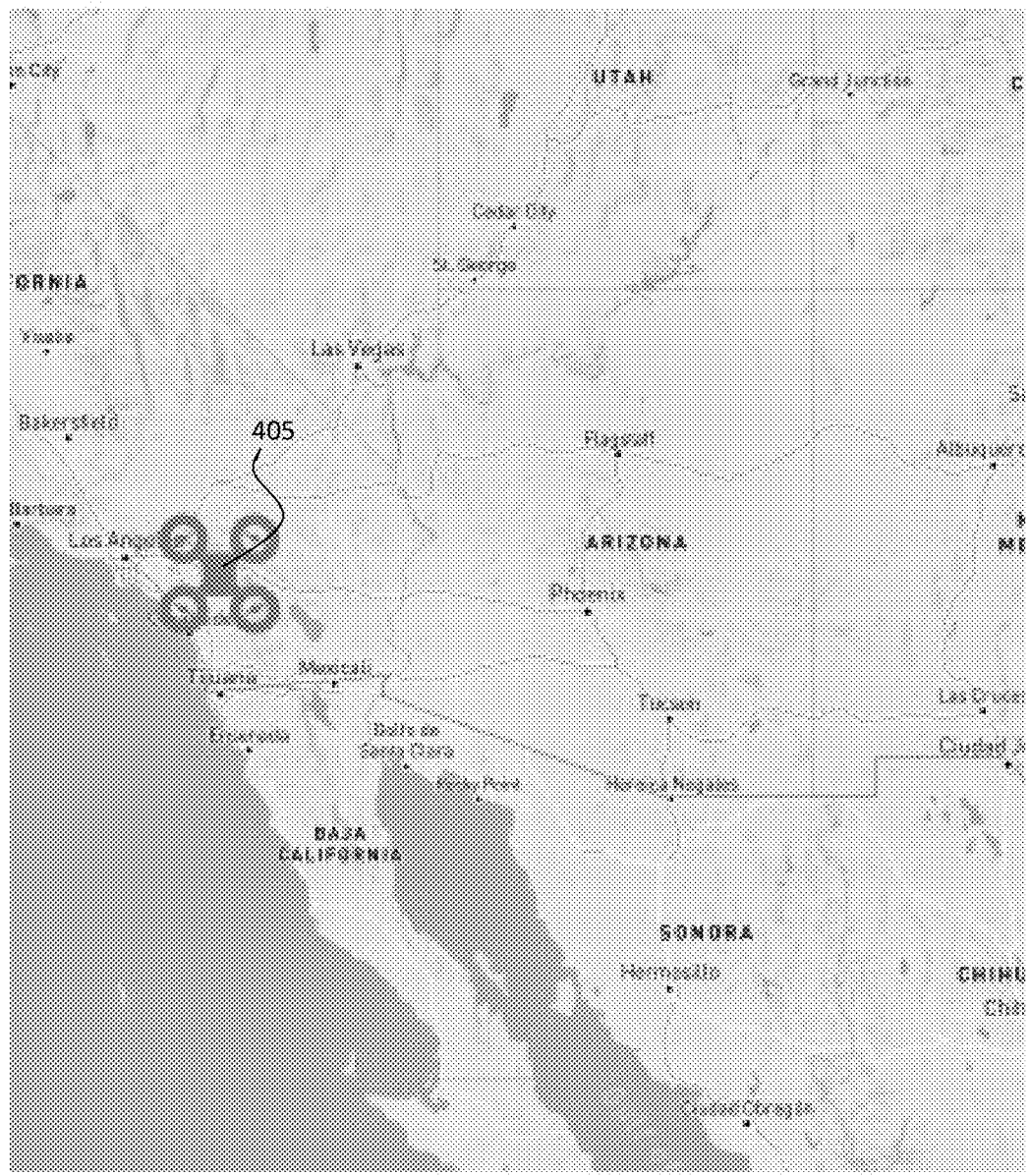
Figure 9:
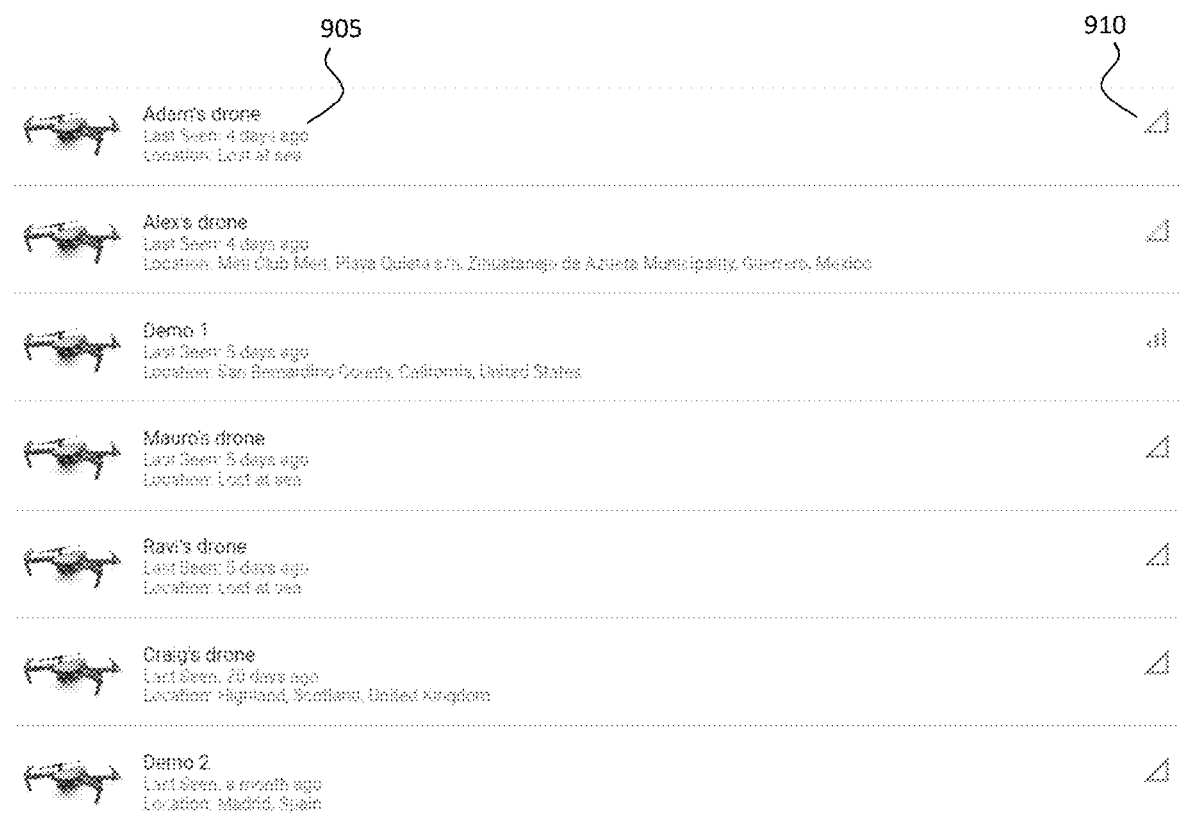

Selecting the drone can be done by selecting an icon (405) on a displayed map, as shown in FIG. 4. An alternative way to select a drone is shown in FIG. 9, with a list of drones (905). Their online status (910) can be shown graphically, or as text.

Figure 5:
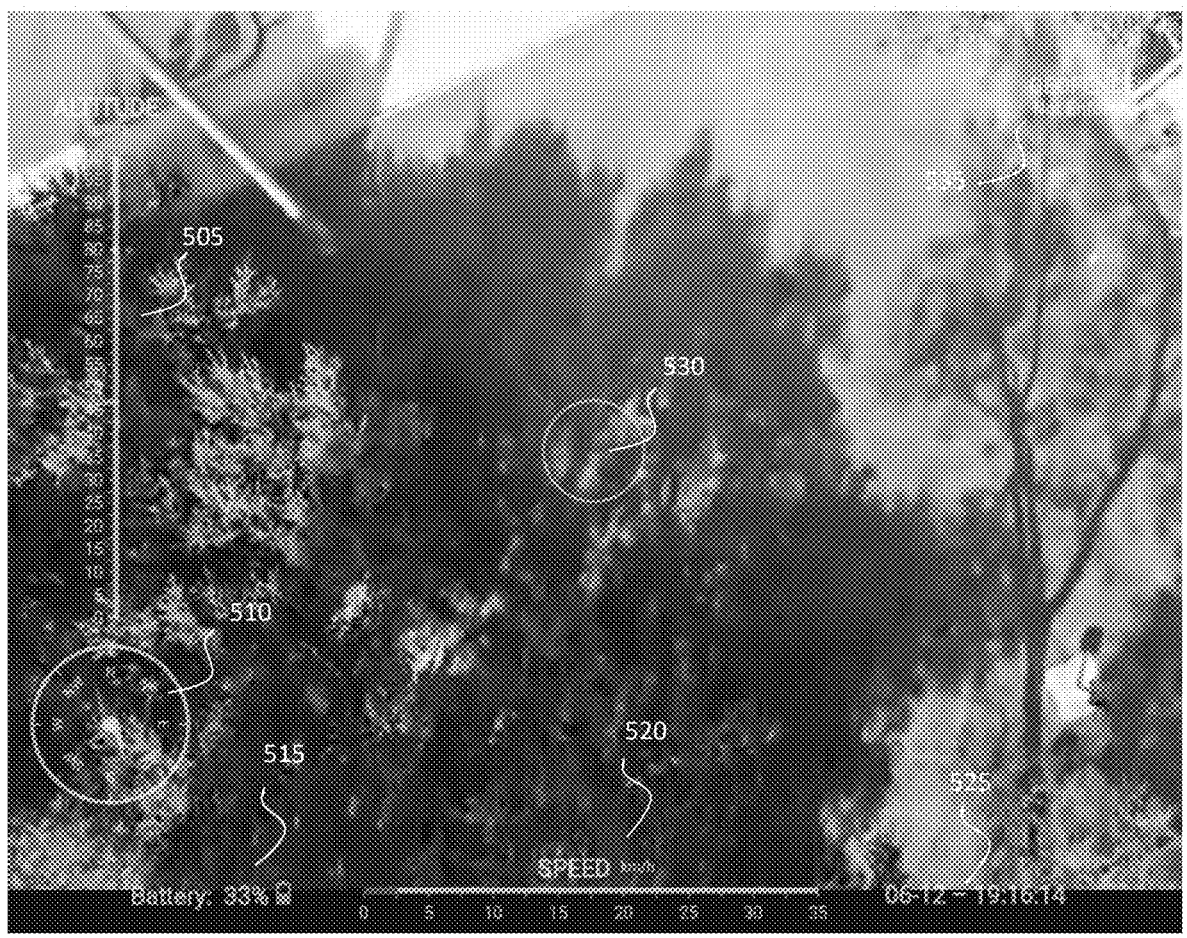

If the user selects "Watch" or "Saved Media" (see FIG. 3), they can be provided a screen as shown in FIG. 5. This shows the camera view of the drone, with information, overlaid, such as altitude (505), compass heading (510), battery power remaining (515), speed (520), date/time (525), center-of-view (530), and geofencing indicator (535). The view can be live or pre-recorded and can be digitally zoomed to adjust the image center and zoom level. The drone can be flown by another user, or automatically following a pre-set flight path.

Figure 6:

If the user selects "Control" (see FIG. 3), they can be presented with a view as shown, for example, in FIG. 6. This is much like the screen in FIG. 4, but additionally has viewer interactive controls (e.g., touch screen, joystick controller, mouse/keyboard, etc.) that allows drone take-off (605), heading/altitude control (610), forward-backward control (615) and lateral control (615). Separate camera control can also be provided. The time remaining (620) can be shown if there are limits on how long a user can control the drone. Additional menu options for camera control (625) and other options (630) can be selected.

Note that these controls are not necessarily the same control options provided by the drone manufacturer (e.g., in the drone controller). The system can potentially support multiple drone models/vendors, offering users a unified interface to them.

Figure 7:
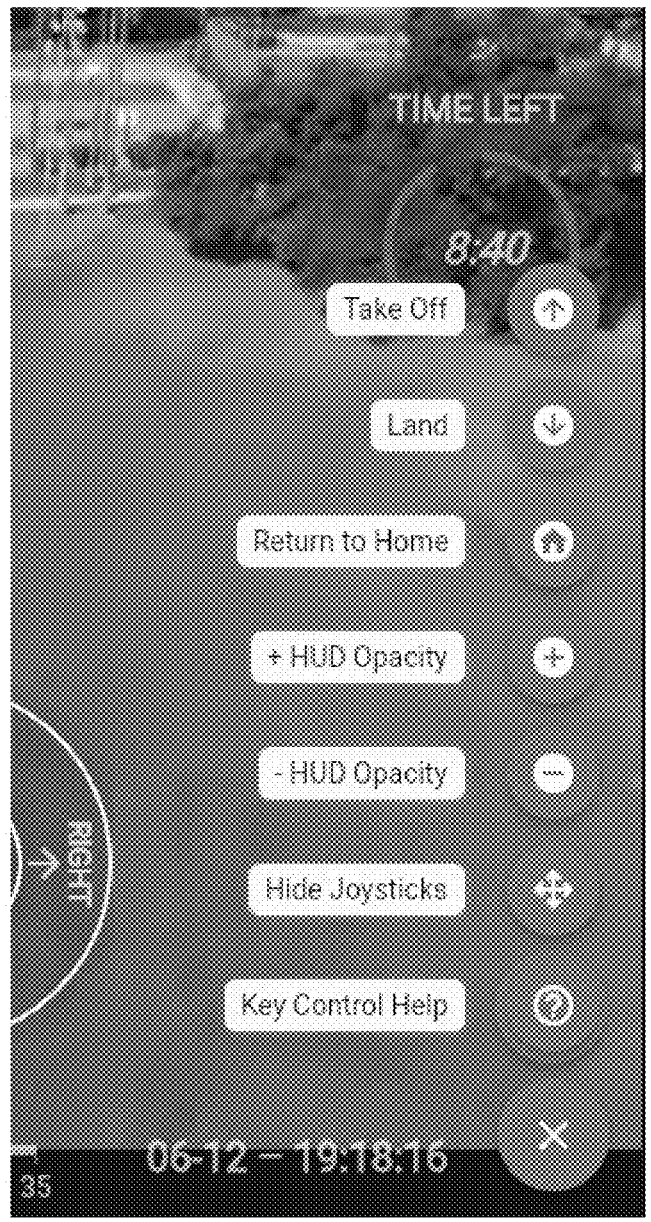

Other options can include things like take off, land, return to home (e.g. the nest), increasing/decreasing the HUD (heads up display—the overlayed images) opacity over the video, hide/show the joystick controls (to provide clear screenshots), and a help menu. An example is shown in FIG. 7.

Figure 8:
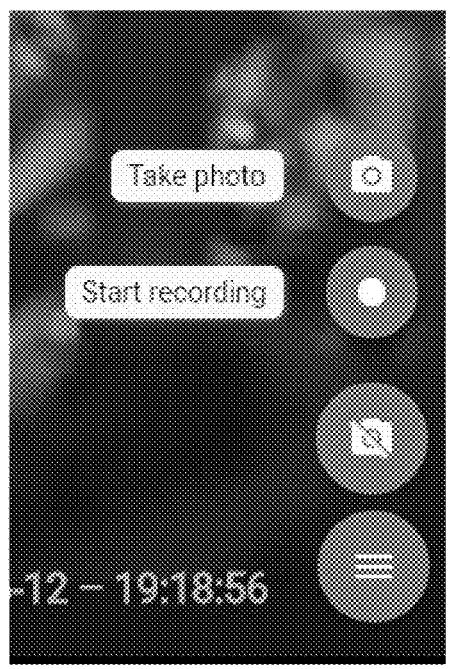

Camera controls can include photo capture, video start/stop, zoom controls, and other camera options. An example is shown in FIG. 8.

Virtual/Augmented Reality

Figure 11:
FIG. 11 shows an example of the video image with an AR overlay.

In an embodiment of the system as shown as an example in FIG. 11, an augmented reality (AR) function can be built into the system to superimpose (virtual) laser beams (1105) or other virtual battle effects (explosions, missiles, gun fire, flames, etc.) (1110) into a drone's (real) video stream, allowing for virtual drone battles between two or more competing drones or drone teams. The system automatically detects hits by collision detection on the AR video. For example, after a number of hits a drone is marked as downed and leaves the game automatically (automatic landing/return-to-home) and the last drone standing wins the game.

In an embodiment of the system, an AR function can superimpose a drone's 3D geofence (1115) over the drone's video stream. Geofence's (a polyhedron) vertices and edges are rendered as strong points and lines drawn onto the video image, and sides can be rendered in a semi-transparent way.

In an embodiment of the system, an AR function can superimpose, virtually, identifiable features (1120)—like treasures, markers, flags, etc.—for a drone treasure hunt, drone capture the flag, drone follow the path, drone races, etc. for various games.

GeoFencing

In embodiments of the system, a geofencing system can be established for the drones. As used herein, "geofencing" is the establishment of virtual boundaries for drone flights, wherein flight is only "allowed" (either by terms of service rules or by system enforced control overrides) within the boundaries. The boundaries can also include minimum and/or maximum altitudes for the flights. The boundaries can be a regular geometric shape (like a circle or rectangle) or an irregular continuous enclosed shape. The vertical boundaries can change as a function of horizontal position, allowing the drone to fly lower in areas with no obstacles, for example.

In some embodiments, the geofencing can be programmed by the drone owner, or established by the system (e.g., enforcing government "no-fly" zones for drones), or a combination of both. The geofencing can be programmed by the drone owner by a graphical user interface (e.g., interactive webpage) where the zone is created by the owner plotting points on a map which define the boundaries of the geofence.

In other embodiments, the geofence can be programmed by carrying out a drone flight to define the polygon to act as the border of the geofence.

In some embodiments, the system enforces the geofence by one or more of:

Providing a warning alarm (visual and/or audio) to the user when crossing and/or coming within a threshold distance of the geofence boundary. The alarm for crossing can be different (in visual and/or audio properties) from the alarm for approaching too closely.

Adjusting the controls of the drone when approaching within a threshold distance of the geofence boundary to discourage crossing, e.g., reducing drone speed, preventing approaching or crossing the boundary, preventing turning the drone towards the boundary, etc. This threshold distance can be the same as or different than the threshold for the alarm, if an alarm is also used.

Overriding the controls of the drone if the geofence boundary is reached or crossed, causing the drone to either automatically fly to a pre-determined distance from the boundary (within the geofence) or flying to the drone docking station.

The drone can be automatically flown from its take-off location via autopilot to a point within the geofence, e.g. the closest one.

As discussed above, augmented reality can be used to overlay an image of the geofence boundaries on the drone video stream, so the user can see the boundaries in real-time. Additionally, or in the alternative, a map can be displayed along with the video image showing where the boundaries are and where the drone is currently located relative to them.

Autopilot

In some embodiments, the system can autopilot the drone while it is being used by a user. In autopilot situations, the user does not control the drone (direction, speed, altitude, etc.), but the system server does.

In some embodiments, the drone can autopilot the drone to return to a docking station. In some embodiments, this is done when the drone battery drops below a certain point. In some embodiments, this is done after a certain amount of flight/usage time has passed. In some embodiments this is done when the user has violated a rule (e.g., flying beyond a geofence boundary, damaging the drone, etc.).

In some embodiments, the autopilot can be used to provide the user with a sightseeing tour, where the drone flies a pre-programmed route between waypoints, while the user only controls the camera (direction, recording, zoom, etc.). The waypoints can be pre-programmed by the system provider, or it can be programmed by the drone owner. The programming can be done by a web interface where waypoints are selected by, for example, clicking on locations on a map using a mouse.

In some embodiments, the autopilot can be defined through an initial manual flight, which is then processed, filtered and fine-tuned to obtain a sequence of points to establish the autopilot's path.

In some embodiments, one or more users can be provided with camera control and/or the ability to pause and resume movement of the drone during an autopilot-guided automated flight or mission.

In some embodiments, the path of automated missions can be programmed by placing waypoints in a map.

In other embodiments, the path of automated missions can be programmed by manually carrying out a flight and using that as a template for subsequent automated missions.

A user interface can be used to provide a vector of viewing directions or points for one or more cameras to look at during an automated mission or flight path.

In some embodiments, the system allows for the shared use of each drone by multiple users through a combination of a) remote control, b) live streaming of drone footage, c) geofencing and automated drone return to home to allow for the safe flight of drones, d) an easy-to-use user interface for easy drone operation by non-specialized users and e) financial incentives for drone owners to share their drones with others, such as pay per flight, pay per minute of flight, pay per view and/or sharing of revenues in proportion to the utility obtained by users from each user's drones.

An app store can be provided to allow different software developers to provide different applications to control functions of a drone. These applications can be abstracted to work for multiple drone models.

In some embodiments, a user can provide his/her location, either one time or continuously during a period, and have these be used to guide a drone to come to them and/or follow them. This can helpful, for example, in search and rescue operations.

In some embodiments, a map user interface can be used to allow a user to choose the drone they would like to control and/or view the camera footage of.

In some embodiments, a metaverse can be superimposed on the visual representation of the real universe, allowing people with interest in a real location to congregate in the virtual representation of that place which includes actual footage taken in that place.

In some embodiments, advertisers may purchase advertising space for ads to be shown to anybody who carries out a drone visit in a certain vicinity. In some embodiments, those ads are further targeted based on other known characteristics of the user, such that different users watching the very same footage can get different ads targeted to each user's interests.

In some embodiments, one of the video streams described above can be combined with an audio stream. The audio stream can include:
 a. A guide's narration
 b. A microphone connection on the drone
 c. A microphone connection anywhere
 d. A blend of audio from various users connected to the system
 e. A soundtrack, or
 f. any audio stream source.

In some embodiments, several users can share control of a drone. Either user can control the drone's path or camera angle. If multiple users try to control the drone or camera at once, there are two options:
 1. average their input, or
 2. have a priority list of which user takes precedence over any other.

In some embodiments, a user may transfer control of the drone to another user.

In some embodiments, a user may click on a location in a map to have the drone automatically fly to the corresponding location.

In some embodiments, a first user may charge a fee to allow a second user to fly the first user's drone.

In some embodiments, subscription revenue from users is split in accordance with a function monotonically increasing with the number of views of videos and/or the number of flights and/or the number of minutes flow and/or the likes or rating of flights of each user's drones.

In some embodiments, audio is shared selectively only with some subset of users. For example, speakers of a particular language may be presented with a narration in their language.

In some embodiments, the present invention may automatically swap one drone with another one when the first drone is close to running out of batteries or range from its remote control, to allow continuity of flight/mission.

In some embodiments, the present invention may automatically show each user the most relevant videos, either being recorded in real-time or recorded previously, given the user's history of preferences.

In some embodiments, drone footage is replaced by footage from other sources, such as cell phone videos, robots or other cameras.

A number of embodiments of the disclosure have been described. Nevertheless, it will be understood that various modifications may be made without departing from the spirit and scope of the present disclosure. Accordingly, other embodiments are within the scope of the following claims.

Control Options/Alternatives

When controlling a drone remotely, we need the lowest possible latency for good control, and also the lowest possible bandwidth. That way, the video and control channels can work under a wide range of connection and network types and situations.

There are a number of ways in which one can establish a connection between a remote pilot and a drone:
 1-to-1 (low latency, low bandwidth): A peer-to-peer (direct) connection between the drone and the remote pilot. Lowest possible latency, and low bandwidth. But no possibility for third parties (other users) to watch the flight's video feed.
 1-to-1+N (low latency, high bandwidth): A peer-to-peer connection between the drone and the remote pilot (1-to-1), plus another connection to a centralized server to which other users (1-to-N) can connect to watch the video stream.
 1-to-N(high latency, low bandwidth): A peer-to-peer connection to a centralized server. Both, the pilot and other users (1-to-N) connect to this centralized server to either control or watch the drone.

Drone ID System

In some embodiments, users can select a drone to access (for control and/or viewing) by a unique ID (series of digits, series of characters, URL link, etc.) assigned to the drone. In some embodiments, this unique ID can also be associated with a permissions system in the system backend or the drone backend, where control and/or viewing permissions are set for various sets of users (which would also have unique IDS, e.g. usernames).

Advertising

In some embodiments, the drone footage (live or recorded) can include or be paired with advertising that is automatically selected based on one or more of: user information, user location, and drone location. For example, the advertising can be for businesses located in or near the region the drone is flying, targeted to estimated or gathered interests of the viewer. Such as, a viewer who indicates that they enjoy fishing on their profile can be shown advertising for bait shops in the region where the drone footage is taking place.

Collision Avoidance

In some embodiments, the system includes a method to keep drones from colliding with each other that consists in assigning a different altitude to each drone within a certain range of each other. This can be done in a number of ways:

Collision Avoidance Example 1: When the number of drones is small enough and the altitude requirement allows for enough different altitudes, each drone can be assigned a different altitude and kept at that altitude while in flight. For example, if there are 20 different drones in the program at a college campus, one drone can be set to an altitude of 30 m, one at 30.5 m, one at 31 m, etc.

Collision Avoidance Example 2: When the number of drones is larger or the drones are required to fly at different altitudes, the altitude assignment can be made dynamic, so that every time that a drone comes within a configurable distance (which could be static or defined by the drones' velocity times a minimum time separation desired between drones) of another one, the system ensures the altitude of the two drones differ by at least a minimum configurable distance, and if it doesn't, moves the drones away from each other in altitude by adjusting the altitude of one or multiple drones. So, for example, when two drones come within N meters of each other at the same altitude, one would be shifted some set distance (e.g. 0.5 m or 1 m) up while the other one might be adjusted the same distance downward.

Escort Features

In some embodiments, the system can have a drone automatically follow a person and record/broadcast them to watchers.

In some embodiments, if the drone detects an obstacle in front of its path (tree, building, post, etc.), it will climb until it detects no obstacles ahead.

In some embodiments, the person being followed can use an app on their mobile device to either a) land the drone on site upon arrival at their destination or b) press a button to have the drone go back home to the base it took off from.

In some embodiments, the person being followed can take the drone remote controller and a mobile device with a drone app with them (e.g. in a backpack) to extend the range to anywhere that they went as long as there was cellular coverage and enough battery. They can even land, replace batteries and keep going for longer walks, jogs, etc.

In some embodiments, the system can automatically alert a list of people configured as watchers for the user requesting an escort so they can begin watching the footage in real time. The alert would include a link to the video feed. The alerts can include text messages, phone calls, in-app notifications and/or emails.

In some embodiments, the system can have an ALERT button on the app used by the escorted person that alerts people in a configured list (e.g. campus police) that an emergency is going on. This allows for redundancy e.g. an emergency can be detected visually by a watcher, or reported by the escorted person themselves.

Drone Summoning

In some embodiments, a person can use an app to send their location to summon a drone escort, allowing the system to send a drone to their location either immediately or at a scheduled time. The drone can then follow the person until they enter a building, keeping them safe (e.g. by monitoring) for the duration of their outside walk.

In some embodiments, after the drone is summoned to the person, a pilot flies the drone to follow the person during their walk. In some embodiments, the person specifies a destination (e.g. in a map UI or from a drop down menu of list of places) and a speed, and the drone carries out a predetermined mission from the summoned spot to the selected destination at the selected speed. The person can then adjust the speed if required, or pause the drone for a rest.

The drone escort's following of the person can use a location shared by an app with location based on GPS or other signals and/or visual tracking of the person.

Algorithms:

For the summon drone step (see Method Steps below) a simple straight-line flight between the drone and the user is performed. Summoning modes may include a route planner, in order to find the best obstacle free flight path to the user.

For the "follow user" step, this can be a location update of the user's position obtained from the user's phone's GPS (global positioning system). The user location can be smoothed through a moving average filter to avoid jittering and/or randomized/noisy GPS readings. Location can also be checked for maximum distance from previous from current point (i.e. outlier removal), for safety. In some embodiments, the follow user step can include a form of user detection through computer vision and/or machine learning, with the aim of having the user always centered in the drone's field of view.

The drone's location itself can be commanded through a PID (proportional-integral-derivative) controller, to avoid jittering, overshooting, and oscillations. The user location updates are minimized (updates are smoothed, and distance between location updates must be larger than a configurable threshold for an update), in order to maximize battery duration, and reduce both drone's noise and jittering.

In some embodiments, there is a mechanism to define and adjust the following distance. That is, in the "follow me" step the drone's location is the user's location, offset by a given following distance, which can be user configured/ dynamically adjusted. So that the drone following the user is not necessarily directly over the person, but tracks the user at a distance/an angle.

Other parameters that can be user defined, and/or dynamically adjusted, are the drone's following height, speed, and offset camera angle. All of them between ranges, that is, minimum and maximum values for all of these parameters, to avoid invalid or wrong settings.

Another parameter that can be user defined and/or dynamically adjusted is the following mode (always behind vs. normal (user in FoV—field of view) modes).

There are a number of possible extensions to this mode. The user's heading can be computed from the previous vs current user's position, and the drone can be instructed to be located and following the user always from behind, instead of just aiming at having the user in the drone's camera field of view. This is similar to how first-person view works in computer role-playing games and the like (i.e. over the shoulder point of view).

The estimated user heading and average speed can also be used to provide user location estimates in case of GPS signal loss, lack of temporary communication between the server and the drone apps, or other (temporary) failures. These estimates would use a collision detection and obstacle avoidance mechanism in order to be implemented safely and generally enough.

The camera pointing method is just a camera gimbal's pitch angle estimation based on the drone's position and height, versus the user's position and height. Some embodiments can involve a dynamic update on the camera's angle depending on user's speed, last tracked position, and next user's position estimate.

The following distance can be adjusted dynamically based on the error ellipse of the user's GPS. If the user's GPS error is large, the following distance can increase (in order to make sure the user is in the drone's field of view). When the GPS signal is good quality and has a small error ellipse, the following distance and or height can be reduced accordingly, to get a better grasp at the user without losing it from the FoV. This can be configured to work between minimum and maximum values, and to have different precedence (distance over height vs. height over distance).

Method Steps:

In some embodiments, there are four main steps:
1. Determining a nearby available drone (or drones, if multiple drones are to follow) through the user facing app by comparing the GPS coordinates of the user's device to known drone locations. That drone can be provided by the user itself, by another user, or by an automated system (e.g. a Nest). The provision is done through the drone facing app, or an equivalent in the case of the Nest.
2. The system automatically flying the drone(s) to the user's location through an app. This depends on availability and closeness to the user (max summoning radius). This requires safe minimum height, for obstacle free flight. In some embodiments, this is a just a straight-line path flight between the drone's location and the user's location, at the designated minimum height. In other embodiments, this can involve a route planner step, to define the best obstacle free route to reach the user at a convenient low altitude (less than 30 m). It can also include collision and obstacle avoidance, to reach the destination safely even if there are unplanned, unknown, permanent or temporary obstacles in the flight path.
3. The system automatically has the drone(s) follow the subject. This also can be augmented through obstacle and collision avoidance. A simple obstacle avoidance method would be, to increase the flight height until the obstacle is overcome (up to a maximum safety height). Other, more complex option would be, to surround the obstacle in order to overcome it, and then resume following the user. The functionality also includes bailing/aborting/returning to home in case of obstacles that cannot be overcome (e.g. user enters a building), lost GPS signal for a determined amount of time, low battery condition, signal loss, etc.
4. Drone(s) returns to base. Either on user's request (e.g. user says "stop following me") or automatically in case of an error condition (low battery, GPS signal loss, etc.) the drone returns to its starting point, and land safely and autonomously. Alternatively, some user profiles can have the option to land the drone, to switch batteries by example, and continue the follow me operation. This must be restricted though user profiles, to avoid theft and/or malfeasance. The landing spot can be at a home base or at the user's (one being followed) last known position.

In some embodiments, the system includes a personalized travel guide, for example a drone follows a walking tourist for safety or broadcasting to friends, family or followers, while providing personalized travel guidance (directions, information about surroundings, history, etc.). This can be sent to the user and/or the watchers. In some embodiments, the personalization can be formed by the user's location (e.g. latitude and longitude converted to a city location) and the identity of the user (or watchers) from their account profiles (hometown, occupation, nationality, interests, etc.).

For example, if the user is known to be from Argentina, works as an inventor and entrepreneur, and is doing an escorted tour of Pasadena, CA, the system can display:

"What are some interesting facts about Pasadena that would be of interest to an Argentinian inventor and entrepreneur?"

Followed by a list of facts about Pasadena related to those keywords (Argentina, inventor, entrepreneur).

Voice Chat

In some embodiments, the system includes a many-to-many voice communication channel (through internet) that would allow the watchers talk with each other, and with people being escorted, who connect to the same audio channel while watching the same drone real time footage.

Crash Avoidance

When designing a mission or a geofence, the drone will ordinarily take off toward the mission's first waypoint or the geofence and, in the process, might crash into things. In some embodiments, the system prevents that by adding a vertical flight segment before the first waypoint that gets the drone to clear all obstacles before it sets off on the mission or entering an allowed area in a geofence.

In some embodiments, the system flies a drone to the nearest corner of a geofence upon take off, so that the drone can be confined to the geofence even when launching from outside it. In some embodiments, the drone will first take off vertically until a safe distance above all surrounding objects, and then go to the nearest point of the geofence.

The vertical distance can be determined in a number of ways. For example:
 1. A predetermined altitude that is safe in most places
 2. A predetermined altitude that is known to be safe in that location of that drone
 3. Automatically extracting altitude data from a topographical map
 4. Via visual inspection, having the drone spin while rising until it sees no obstacles in any horizontal direction within a predefined distance.

Global Geofencing

Global Geofencing is a system that sets Geofencing constraints that allow people to opt their property (or, through face recognition or GPS tracking, themselves) out of appearing in video from the drone flights. For example, the White House and every legally out of bounds area will be in the global geofence, which means that the system won't allow any flights to venture into those areas. But property owners will be able to designate their own properties out of bounds as well. In addition, the system can cut off or blur video when the camera is directed at Globally Geofenced areas when the drone is outside those areas.

Metaverse-Like Interaction

In some embodiments, the system can give users a virtual place to congregate around a spot that is not just a virtual representation of the spot but has actual drone footage in real time of the actual place in the real world.

The metaverse has representations of each place on earth (e.g. Times Square), and is a place for people with interest in a place to congregate and interact regardless of their physical locations. This system allows them to do the same in a way that's grounded to the actual location of the place (e.g. Times Square), chatting and interacting while viewing what's going on there, flying around, etc.

Example System

Figure 10:
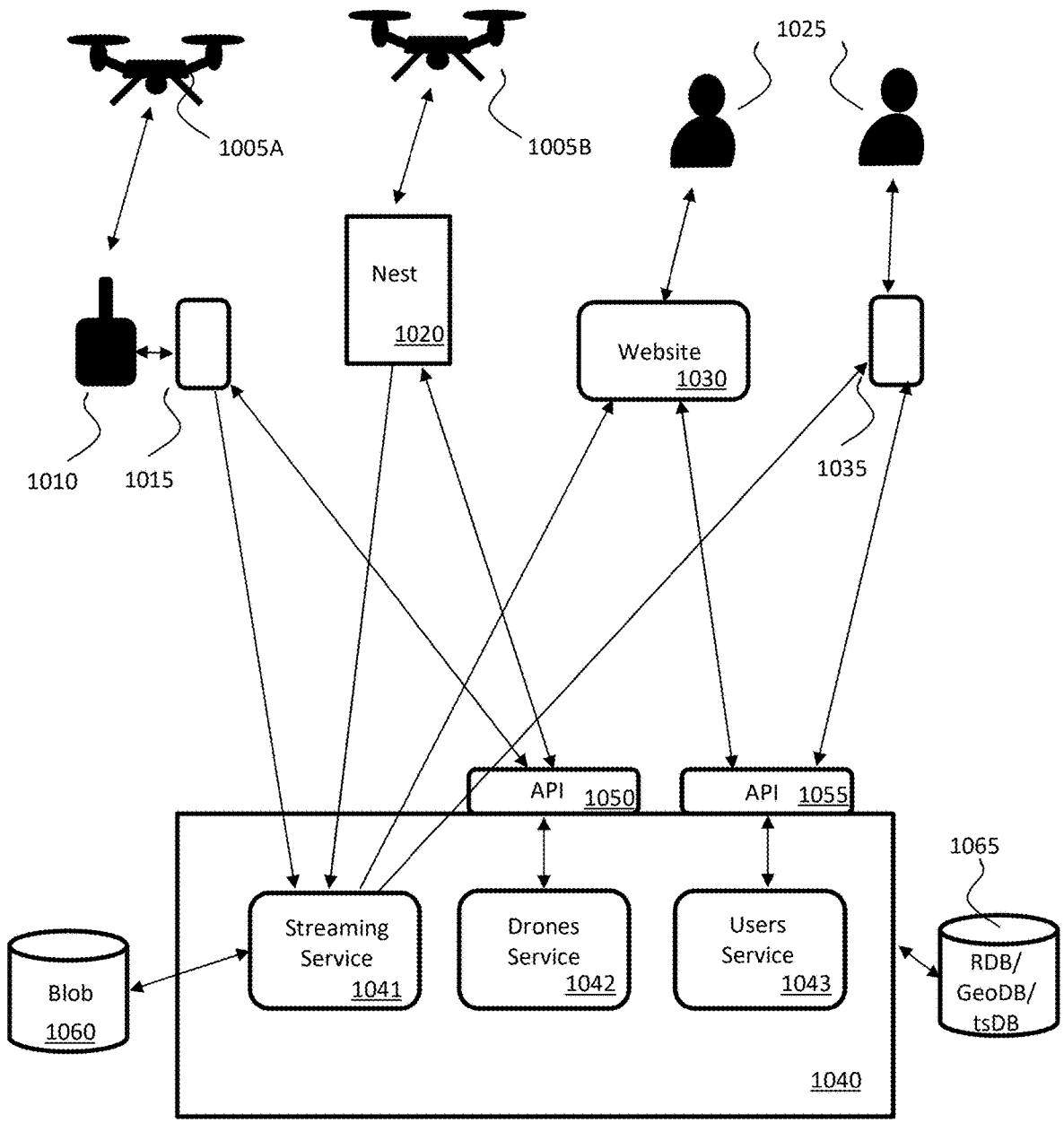
FIG. 10 shows a further example of the system.

FIG. 10 shows an example of the system according to some embodiments. Drones (1005A and 1005B) are integrated into the system by either a controller (1010) connected to a mobile device (1015) or a Nest-like docking station (1020). In some embodiments, the controller (1010) can be part of a docking station. They connect to the system server(s) (1040) via a network (e.g. internet) to provide streaming video to a streaming service (1041) and to a drone service (1042) via a drone service API (1050). Users/viewers/watchers (1025) can use a website UI (1030) or mobile device app UI (1035) to watch the drone video footage from the streaming service (1041) and control drones and/or access footage through the users service (1043) through the users API (1055). The streaming service (1041) can store video for later viewing on a storage system (1060) (e.g. blob storage). The server(s) (1040) can store/retrieve user info, drone info, geofencing info, map info, and metrics info from a database system(s) (1065).

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The following are claimed:

1. A system for remote drone control, comprising:
   an owner software application configured to be loaded on a first device, the owner software application enabling communication between the first device and a drone controller for a drone and providing drone control data to the drone controller;
   a pilot software configured to be loaded on a second device or loaded on a web server that is accessed from the second device, the pilot software enabling communication between the second device and the drone controller and providing the drone control data to first device; and
   a streaming service communicating with the first device and the second device, the streaming service receiving a first video data from the first device and providing a second video data to the second device;
   wherein the system is configured to translate a first set of drone control inputs from the pilot software to a second set of drone control inputs for the drone controller; and wherein the system is further configured to provide augmented reality where computer generated images are superimposed on the second video data; and the computer generated images include images of geofence boundaries.

2. The system of claim 1, wherein the drone controller is part of a docking station.

3. The system of claim 1, further comprising a database connected to the system backend, the database comprising data related to the drone.

4. The system of claim 1, wherein the computer generated images comprise images of battle effects for a drone-based combat game.

5. The system of claim 1, wherein the system is further configured to override the first set of control inputs and generate the second set of drone control inputs by the system.

6. The system of claim 5, wherein the overriding and generating is triggered by an event during drone use.

7. The system of claim 6, wherein the event is the drone dropping below a threshold battery power.

8. The system of claim 6, wherein the event is the drone passing a geofence boundary.

9. The system of claim 5, wherein the second set of drone control inputs are configured to return the drone to a docking station.

10. The system of claim 1, wherein the system allows multiple users to access a single drone, with one set of users controlling the drone while another set of users view the video data.

11. The system of claim 1, wherein the system further comprises a map user interface configured to allow a user to select a drone to control and/or view camera footage thereof.

12. The system of claim 1, wherein the system further comprises options for storing and accessing pre-recorded video from the drone indexed by drone ID or by location.

13. The system of claim 1, wherein the system further comprises automated drone flights following a pre-programmed route between waypoints, where the drone controller only controls the camera direction, recording, and zoom.

14. The system of claim 13, wherein the pre-programmed route is defined by selecting waypoints on a map using a web interface.

15. The system of claim 1, further comprising an application programming interface providing services for drone registration, endpoint negotiation, status updates, telemetry, and command transmission.

16. The system of claim 1, wherein multiple users can share control of a drone, and the system is configured to handle multiple simultaneous control inputs by either averaging the inputs or following a priority list of which user takes precedence.

17. The system of claim 1, wherein the system allows an owner of the drone to charge a fee to allow other users to fly the owner's drone.

18. The system of claim 1, wherein the system provides personalized content to users based on a drone's location and user profile information.

* * * * *